(12) United States Patent
Wu et al.

(10) Patent No.: US 7,995,174 B2
(45) Date of Patent: Aug. 9, 2011

(54) NORMALLY-BLACK MODE LIQUID CRYSTAL DISPLAY HAVING PARTICULAR HALF WAVE PLATES

(75) Inventors: Yi-Chun Wu, Hua Lien (TW); Yu-Cheng Liu, Taipei (TW); Chun-Chi Chi, Tai Chung County (TW)

(73) Assignee: Wintek Corporation, Taichung (TW)

( * ) Notice: Subject to any disclaimer, the term of this patent is extended or adjusted under 35 U.S.C. 154(b) by 378 days.

(21) Appl. No.: 12/273,237

(22) Filed: Nov. 18, 2008

(65) Prior Publication Data

US 2009/0128751 A1 May 21, 2009

Related U.S. Application Data

(60) Provisional application No. 60/989,372, filed on Nov. 20, 2007.

(51) Int. Cl.
*G02F 1/1335* (2006.01)
(52) U.S. Cl. ............ 349/117; 349/103; 349/96; 349/114
(58) Field of Classification Search .................. 349/117, 349/103, 96, 114
See application file for complete search history.

(56) References Cited

U.S. PATENT DOCUMENTS

| 6,204,904 | B1 * | 3/2001 | Tillin et al. | 349/119 |
| 6,341,002 | B1 * | 1/2002 | Shimizu et al. | 349/119 |
| 6,611,306 | B2 * | 8/2003 | Baek | 349/117 |
| 7,733,450 | B2 * | 6/2010 | Kim | 349/117 |
| 2007/0126956 | A1 | 6/2007 | Wu et al. | |
| 2010/0201924 | A1 * | 8/2010 | Wu et al. | 349/102 |

FOREIGN PATENT DOCUMENTS

JP 2003344837 A * 12/2003

* cited by examiner

*Primary Examiner* — Mike Qi
(74) *Attorney, Agent, or Firm* — Muncy, Geissler, Olds & Lowe, PLLC

(57) ABSTRACT

A liquid crystal display includes a first and a second transparent substrates facing to each other, a liquid crystal layer, a first polarizer, a second polarizer, and a first half wave plate. The liquid crystal layer is interposed between the first and the second transparent substrates. The first polarizer is positioned next to the first transparent substrate and opposite the liquid crystal layer, and the second polarizer is positioned next to the second transparent substrate and opposite the liquid crystal layer. The first half wave plate is provided between the first transparent substrate and the first polarizer to enable the liquid crystal display to have a normally black mode.

16 Claims, 12 Drawing Sheets

| Display mode | | Normally white | Normally black / single waveplate | Normally black / dual waveplate |
|---|---|---|---|---|
| Contrast | Transmissive region | 235 | 200 | 210 |
| | Reflective region | 13.1 | 13 | 13 |
| Brightness (cd / m$^2$) | | 174 | 170 | 170 |
| Luminous reflectance | | 6.6% | 6.6% | 6.6% |

FIG. 12

NORMALLY-BLACK MODE LIQUID CRYSTAL DISPLAY HAVING PARTICULAR HALF WAVE PLATES

CROSS REFERENCE TO RELATED APPLICATION

This application claims benefit of U.S. provisional application No. 60/989,372 filed on Nov. 20, 2007 under 35 U.S.C. §119(e); the entire contents of which are hereby incorporated by reference.

FIELD OF THE INVENTION

The invention relates to a normally-black mode liquid crystal display.

DESCRIPTION OF THE RELATED ART

FIG. 1 shows a conventional normally-white mode transflective liquid crystal display 100. Referring to FIG. 1, in the transflective liquid crystal display 100, a first polarizer 104 and a second polarizer 106 are respectively provided on two opposite sides of a dual-cell-gap liquid crystal (LC) cell 102. The dual-cell-gap LC cell 102 has a transmissive region and a reflective region, and the transmissive region and the reflective region have different cell-gap thicknesses. A first half wave plate 108 and a first quarter wave plate 112 are provided between the first polarizer 104 and the dual-cell-gap LC cell 102. A second half wave plate 110 and a second quarter wave plate 114 are provided between the second polarizer 106 and the dual-cell-gap LC cell 102.

Through the above arrangement of polarizers and phase difference plates, the transflective liquid crystal display 100 is in a normally-white mode. However, since four phase difference plates are needed in the transflective liquid crystal display 100 to form the normally-white mode, it is difficult to reduce the overall thickness and fabrication cost.

BRIEF SUMMARY OF THE INVENTION

The invention provides a normally-black mode liquid crystal display that has a reduced thickness and fabrication cost.

According to an embodiment of the invention, a liquid crystal display includes a first and a second transparent substrates facing to each other, a liquid crystal layer, a first polarizer, a second polarizer, and a first half wave plate. The liquid crystal layer is interposed between the first and the second transparent substrates. The first polarizer is positioned next to the first transparent substrate and opposite the liquid crystal layer, and the second polarizer is positioned next to the second transparent substrate and opposite the liquid crystal layer. The first half wave plate is provided between the first transparent substrate and the first polarizer to enable the liquid crystal display to have a normally black mode.

In one embodiment, the normally black mode is obtained when the following equation is satisfied:

$$2\alpha - 2r + p1 - p2 = 90° + N*180°,$$

where N is an integer, p1 is the transmission-axis azimuth of the first polarizer, r is the slow-axis azimuth of the first half wave plate, α is the oriented viewing angle of the liquid crystal display, and p2 is the transmission-axis azimuth of the second polarizer.

In one embodiment, the liquid crystal display further includes a second half wave plate provided between the second transparent substrate and the second polarizer, and the normally black mode is obtained when the following equation is satisfied:

$$2r2 - 2\alpha + 2r1 - p1 - p2 = 90° + N*180°,$$

where N is an integer, p1 is the transmission-axis azimuth of the first polarizer, r1 is the slow-axis azimuth of the first half wave plate, α is the oriented viewing angle of the liquid crystal display, p2 is the transmission-axis azimuth of the second polarizer, and r2 is the slow-axis azimuth of the second half wave plate.

According to another embodiment of the invention, a liquid crystal display includes a dual-cell-gap liquid crystal cell having a reflective region and a transmissive region, a first and a second polarizers, and a first half wave plate. The cell-gap thickness of the reflective region is different to the cell-gap thickness of the transmissive region. The first and the second polarizers are respectively provided on two opposite sides of the dual-cell-gap LC cell, and the first half wave plate is provided between the first polarizer and the dual-cell-gap LC cell to enable the liquid crystal display to have a normally black mode.

In one embodiment, the liquid crystal display further includes a second half wave plate provided between the second polarizer and the dual-cell-gap LC cell.

According to the above embodiments, a normally black mode is achieved and excellent optical characteristics are obtained simply by providing one half wave plate or two half wave plates between a dual-cell-gap LC cell and at least one polarizer. Hence, the fabrication cost and overall thickness are considerably reduced compared with the conventional design.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 12 lists test values of optical characteristics of a normally black LCD according to embodiments of the invention in comparison with a normally white LCD.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
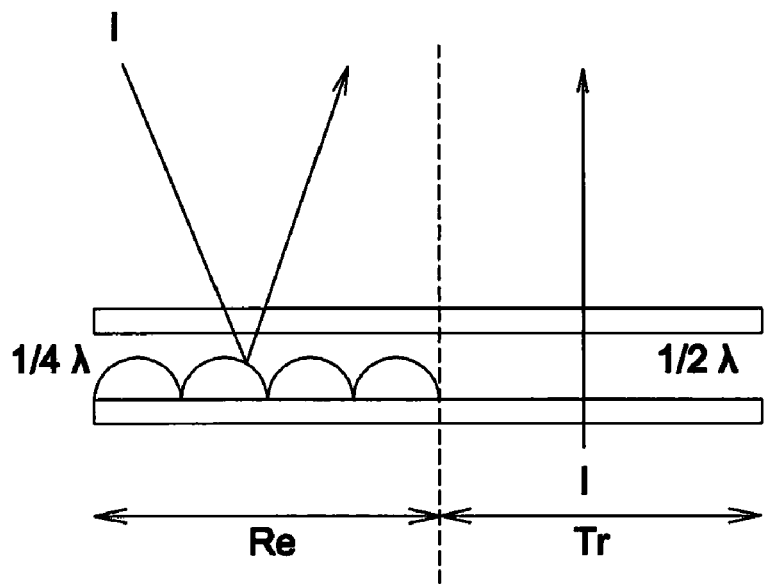
FIG. 2 shows a schematic diagram illustrating optical characteristics of a dual-cell-gap LC cell.

FIG. 2 shows a schematic diagram illustrating optical characteristics of a dual-cell-gap liquid crystal (LC) cell. In the design of a dual-cell-gap LC cell, the phase retardation Δnd of the LC layer for the transmissive region Tr satisfies the following equation:

$$\Delta nd \text{ (nm)} \geq 10 * \frac{560}{360} * \varphi(°)$$

$$\Delta nd \text{ (nm)} = 280 + N * 560 \pm 15\%$$

where N is an integer, $\varphi$ is the twist angle of LC molecules, and the incident light I that enters the dual-cell-gap LC cell is visible light (averaged 590 nm in wavelength).

Since the ratio of the cell-gap thickness for the transmissive region Tr to that for the reflective region Re is about 2:1, the transmissive region Tr may be equated with a half wave plate, and the reflective region Re may be equated with a quarter wave plate. Hence, referring to FIG. 3, in a liquid crystal display (LCD) 10 according to an embodiment of the invention, a first polarizer 14 and a second polarizer 16 are respectively provided on two opposite sides of a dual-cell-gap LC cell 12. A first half wave plate 18 is provided between the first polarizer 14 and the dual-cell-gap LC cell 12, and a second half wave plate 22 is provided between the second polarizer 16 and the dual-cell-gap LC cell 12. According to this optical arrangement, the LCD 10 is in a normally black mode as the following equation is satisfied:

$$2r2-2\alpha+2r1-p1-p2=90°+N*180°,$$

where N is an integer, p1 is the transmission-axis azimuth of the first polarizer 14, r1 is the slow-axis azimuth of the first half wave plate 18, α is the oriented viewing angle of the LCD 10, p2 is the transmission-axis azimuth of the second polarizer 16, and r2 is the slow-axis azimuth of the second half wave plate 22. The oriented viewing angle α is defined by the following description. In case a viewing direction is set as a 3 o'clock direction, the oriented viewing angle equals 0 degree as the twist angle is 0 degree, and the oriented viewing angle also equals 0 degree as the twist angle is 30 degrees, for there being symmetry between the viewing direction and the orientation of LC director as the twist angle is 30 degrees. Besides, in case the viewing direction is set as a 12 o'clock direction, the oriented viewing angle equals 90 degrees regardless of the value of the twist angle. Note the above equation is derived under an ideal achromatic condition for different wavelengths, and a tolerance of ±5 degrees for each angle solution of the above equation is permitted to form a normally black mode under a non-ideal situation, with the optimum angle solution being within the range of ±5 degrees for each angle solution.

Figure 4:
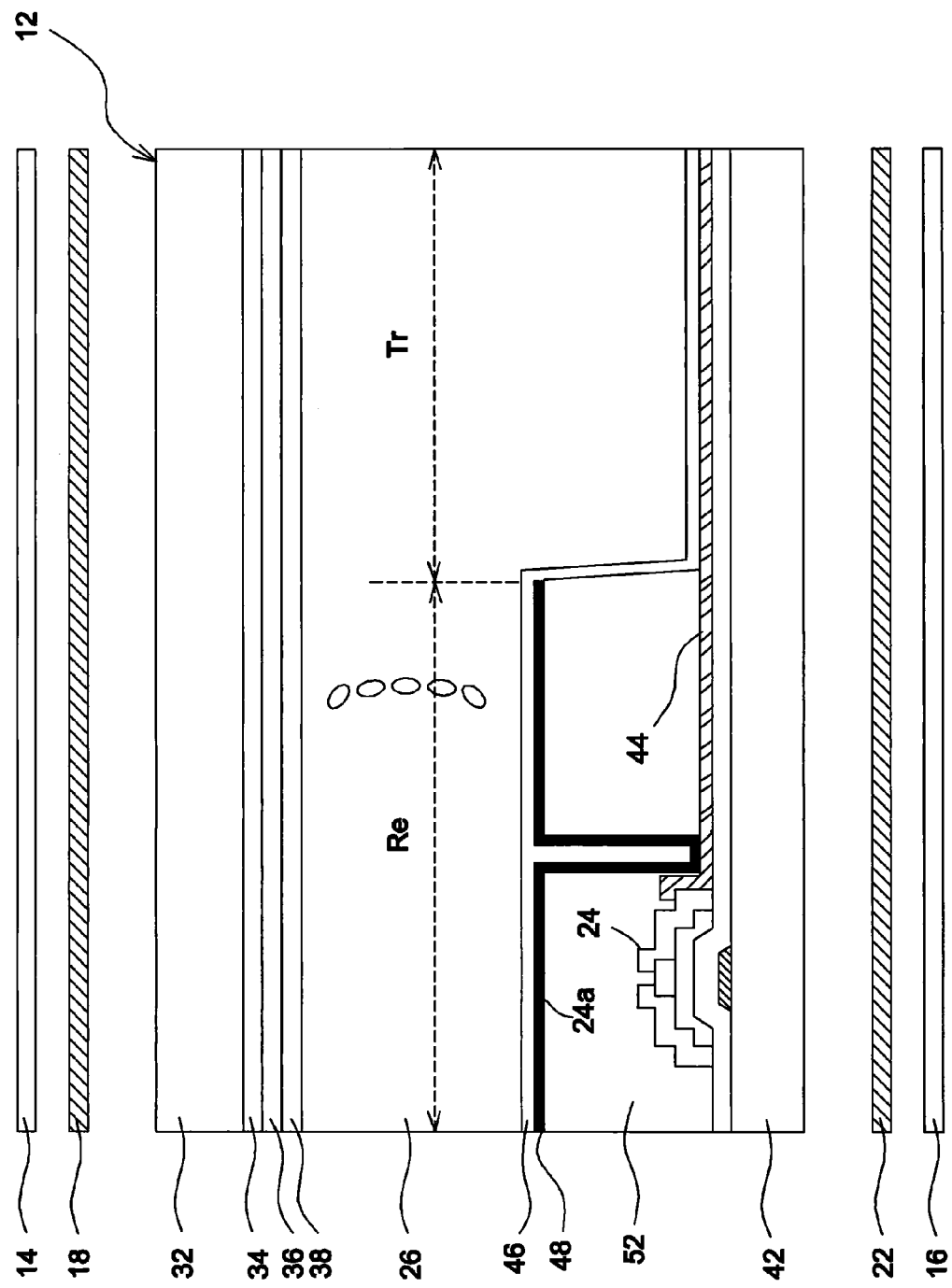
FIG. 4 shows a schematic diagram illustrating the configuration of a dual-cell-gap LC cell according to an embodiment of the invention.

FIG. 4 shows a schematic diagram illustrating the configuration of a dual-cell-gap LC cell 12 according to an embodiment of the invention. Referring to FIG. 4, color filters 34, a common electrode 36 and a first alignment film 38 are formed on a first transparent substrate 32 in succession. Multiple transparent pixel electrodes 44 made from transparent conductive films, a second alignment film 46, and a switching device 24 such as a TFT are formed on a second transparent substrate 42. The first transparent substrate 32 and the second transparent substrate 42 are facing to each other, with a liquid crystal layer 26 interposed between them. The reflective pixel electrodes 48 are formed on a raised insulating layer 52 to enable the reflective region Re and the transmissive region Tr to have different cell-gap thicknesses. A first polarizer 14 is positioned next to the first transparent substrate 32 and opposite the liquid crystal layer 26. A second polarizer 16 is positioned next to the second transparent substrate 42 and opposite the liquid crystal layer 26.

Figure 1:
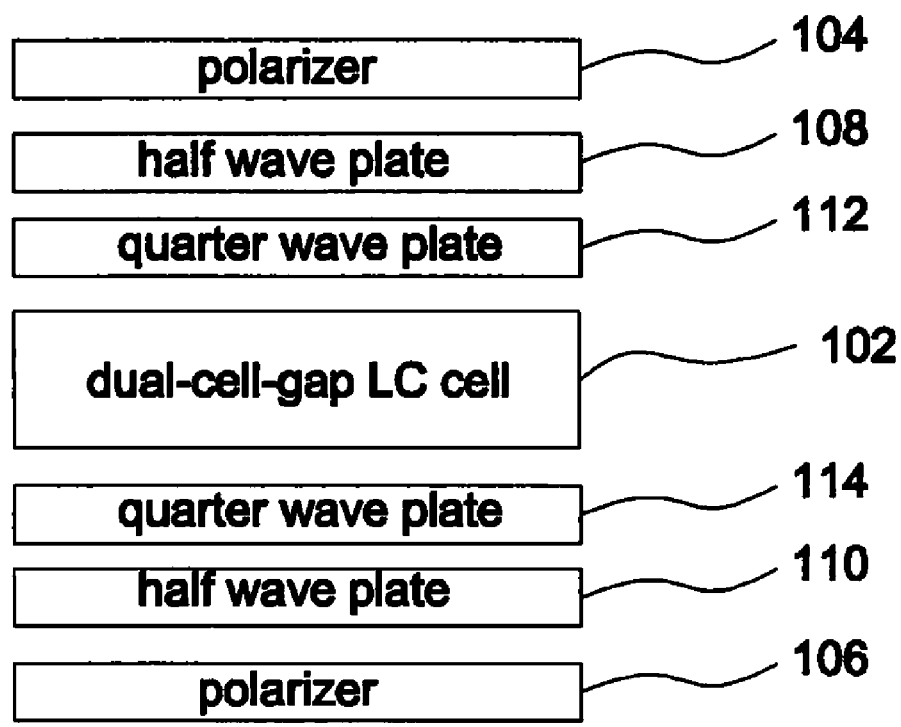
FIG. 1 shows a schematic diagram illustrating a conventional normally-white mode transflective liquid crystal display.

According to the above embodiment, a normally black mode is achieved simply by providing two half wave plates 18 and 22 between the dual-cell-gap LC cell 12 and the polarizers 14 and 16, respectively. Hence, compared with the conventional design shown in FIG. 1 where four phase difference plates are needed to form a specific display mode, the above embodiment may considerably reduce the fabrication cost and overall thickness.

Figure 3:
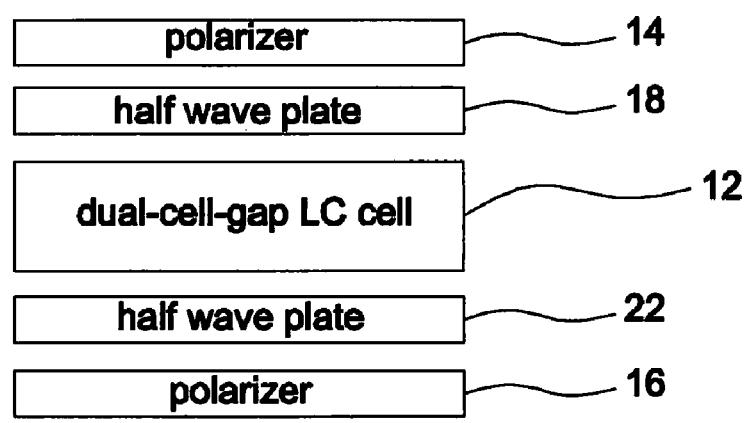
FIG. 3 shows a schematic diagram illustrating a liquid crystal display according to an embodiment of the invention.
Figure 5:
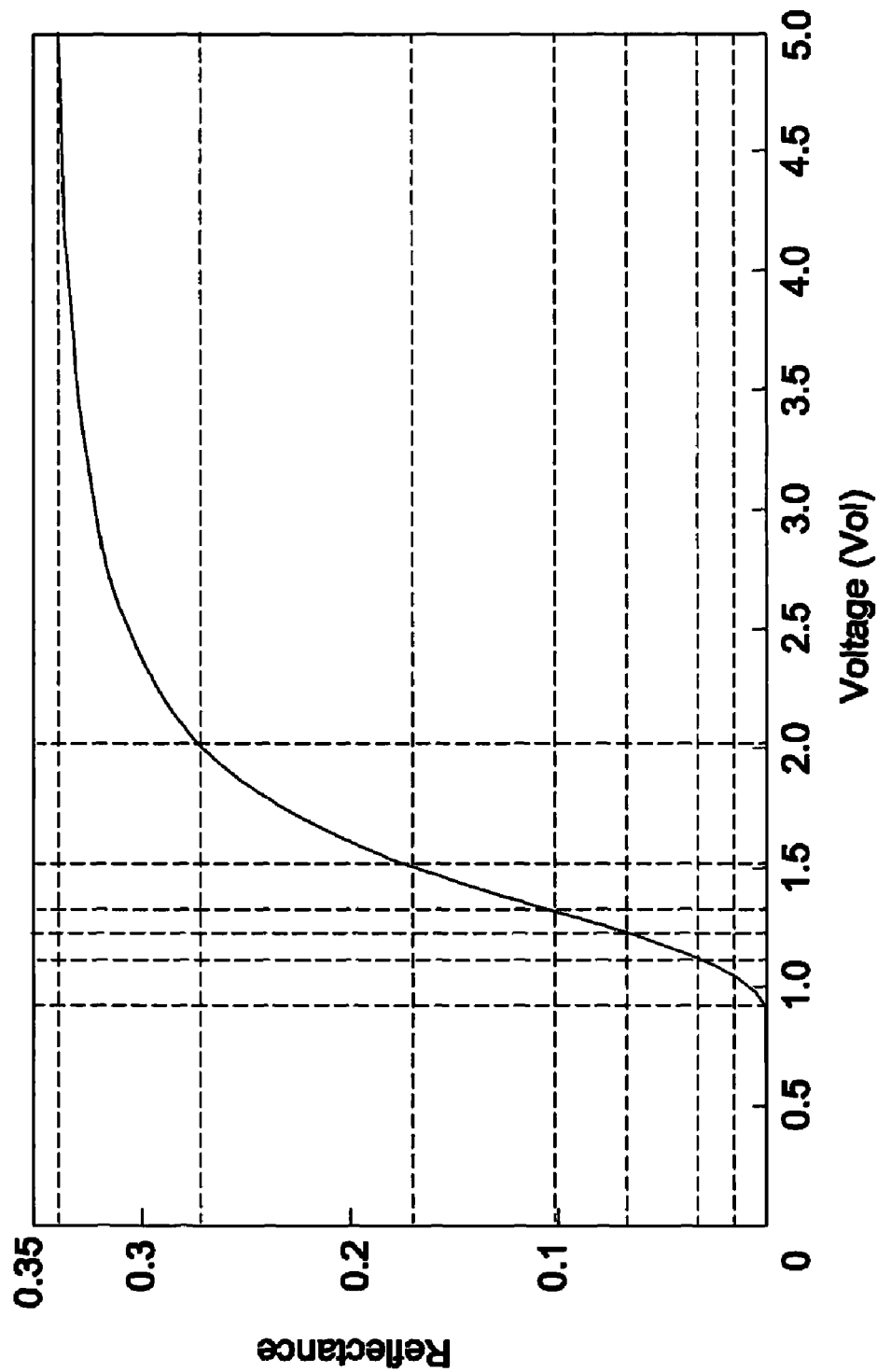
FIG. 5 shows a curve diagram illustrating the V-R characteristics of the optical arrangement shown in FIG. 3.
Figure 6:
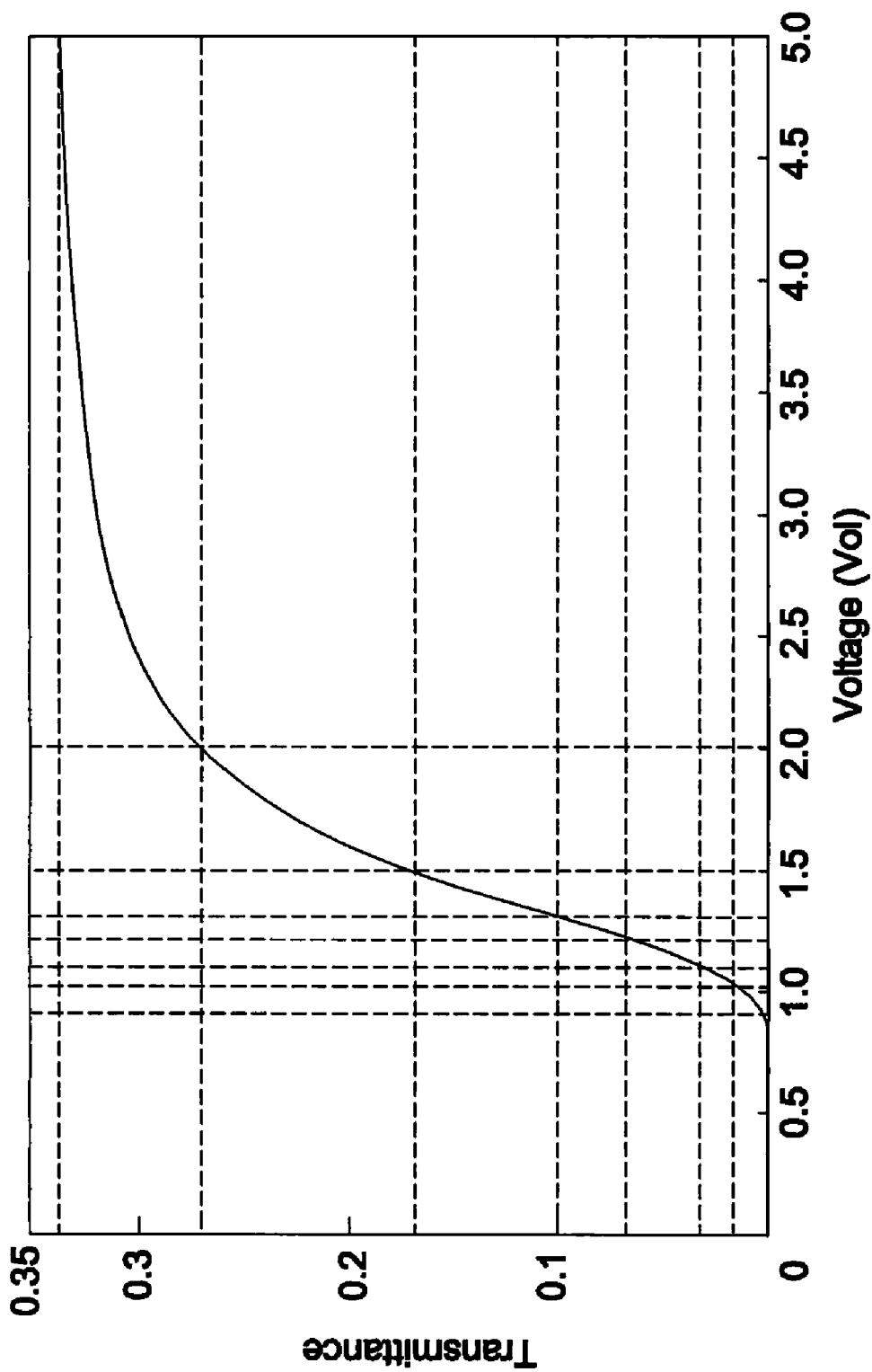
FIG. 6 shows a curve diagram illustrating the V-T characteristics of the optical arrangement shown in FIG. 3.

FIG. 5 shows a curve diagram illustrating the V-R characteristics (voltage versus light reflectance) of the optical arrangement shown in FIG. 3, and FIG. 6 shows a curve diagram illustrating the V-T characteristics (voltage versus light transmittance) of the optical arrangement shown in FIG. 3. The results are simulated under the conditions where the transmission-axis azimuth p1 equals 75 degrees, the transmission-axis azimuth p2 equals 5 degrees, the slow-axis azimuth r1 equals 60 degrees, the slow-axis azimuth r2 equals 115 degrees, the oriented viewing angle α equals 0 degree, the twist angle $\varphi$ equals 0 degree, and the phase retardation Δnd for the transmissive region Tr equals 280 nm. As shown in FIGS. 5 and 6, the optical arrangement shown in FIG. 3 has excellent optical characteristics and achieves optimum optical matching in both the transmissive region Tr and the reflective region Re, and a fully black display under a normally black mode is obtained in both the transmissive region Tr and the reflective region Re when a voltage is not applied.

Figure 7:
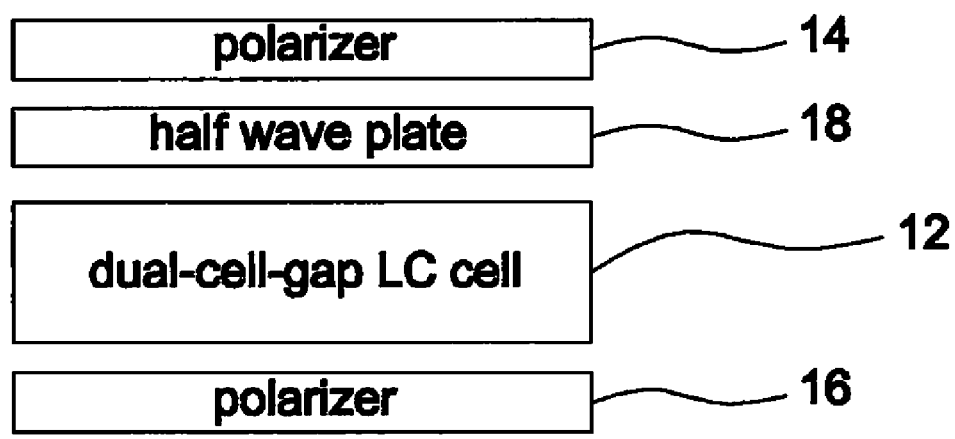
FIG. 7 shows a schematic diagram illustrating another embodiment of the invention.

FIG. 7 shows a schematic diagram illustrating another embodiment of the invention. The optical arrangement of an LCD 20 shown in FIG. 7 is similar to that shown in FIG. 3, except only one half wave plate 18 is used. The LCD 20 is in a normally black mode as the following equation is satisfied:

$$2\alpha - 2r + p1 - p2 = 90° + N*180°,$$

where N is an integer, p1 is the transmission-axis azimuth of the first polarizer 14, r is the slow-axis azimuth of the half wave plate 18, α is the oriented viewing angle of the LCD 20, p2 is the transmission-axis azimuth of the second polarizer 16. Note the above equation is derived under an ideal achromatic condition for different wavelengths, and a tolerance of ±5 degrees for each angle solution of the above equation is permitted to form a normally black mode under a non-ideal situation, with the optimum angle solution being within the range of ±5 degrees for each angle solution.

Figure 8:
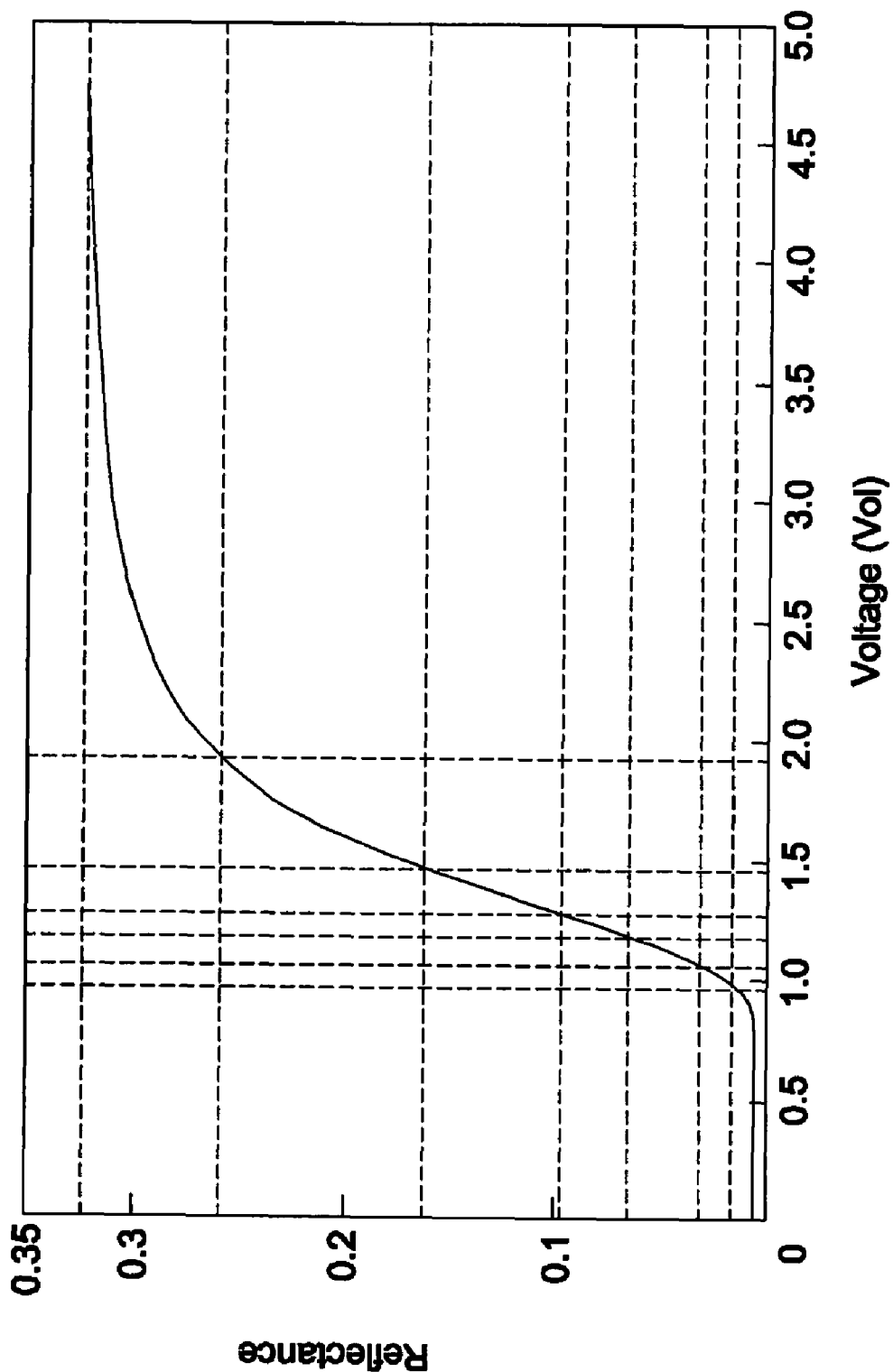
FIG. 8 shows a curve diagram illustrating the V-R characteristics of the optical arrangement shown in FIG. 7.
Figure 9:
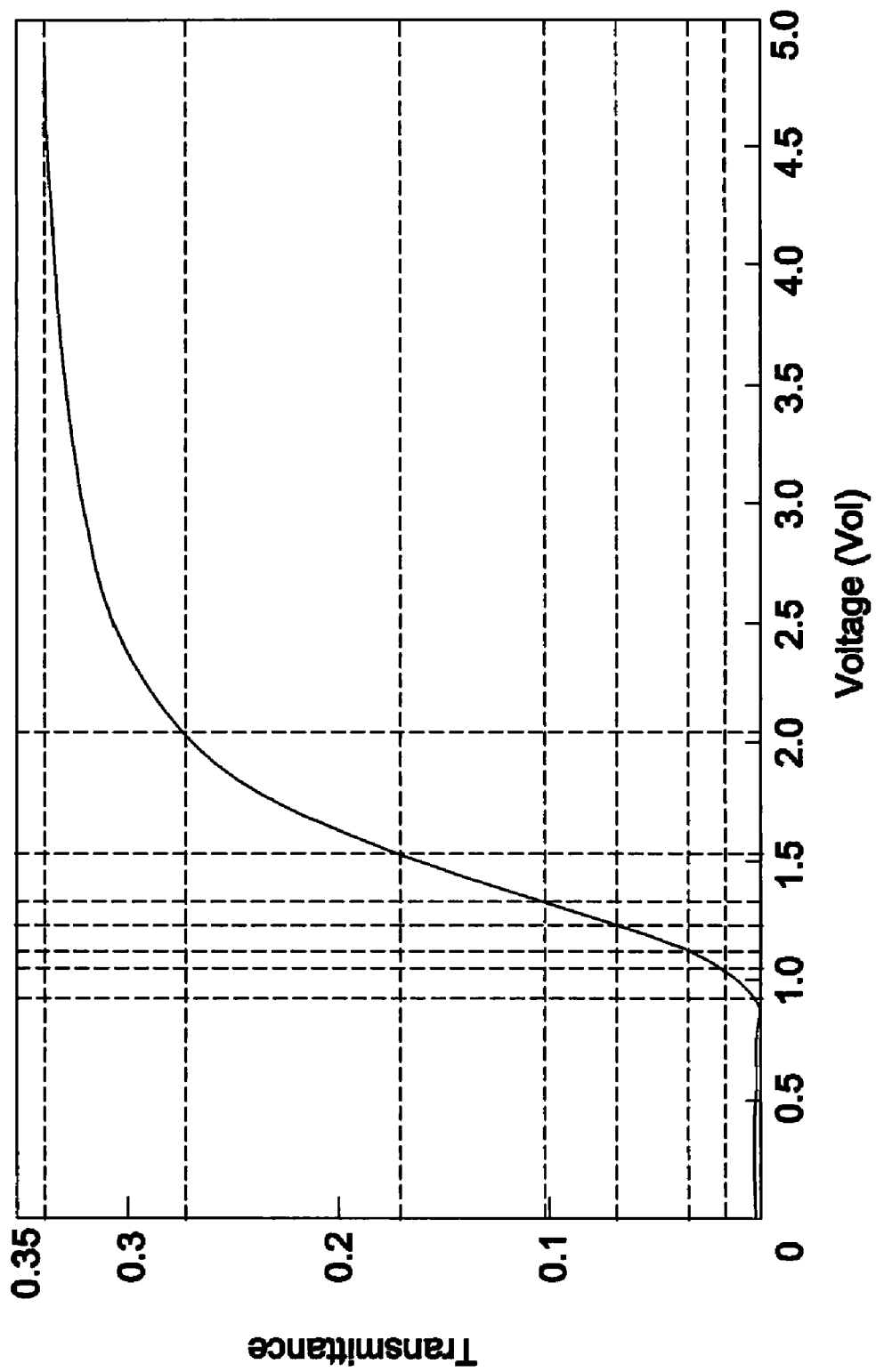
FIG. 9 shows a curve diagram illustrating the V-T characteristics of the optical arrangements shown in FIG. 7.
Figure 10:
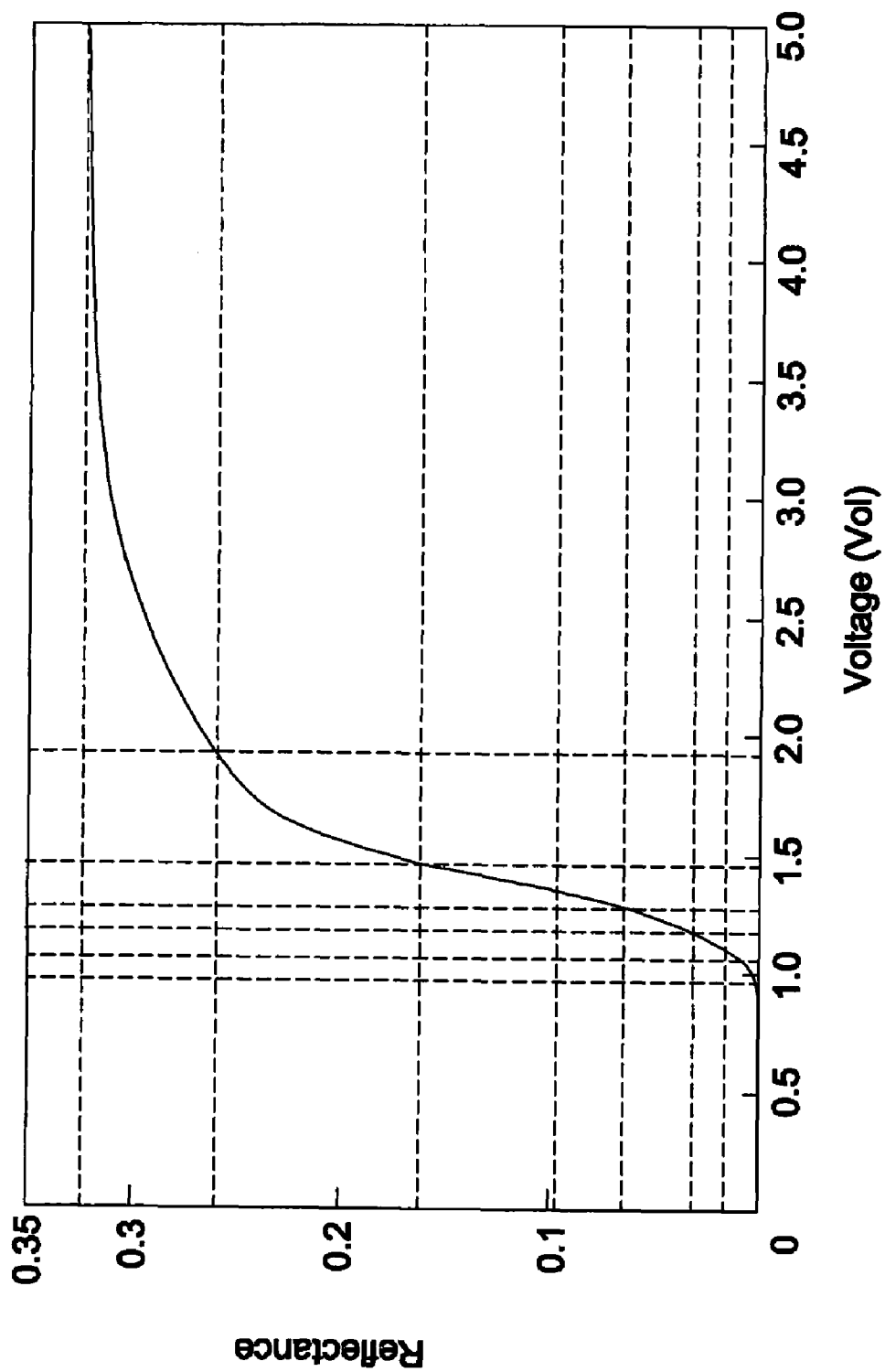
FIGS. 10 and 11 show another curve diagrams illustrating the V-R and V-T characteristics of the optical arrangement shown in FIG. 7.
Figure 11:
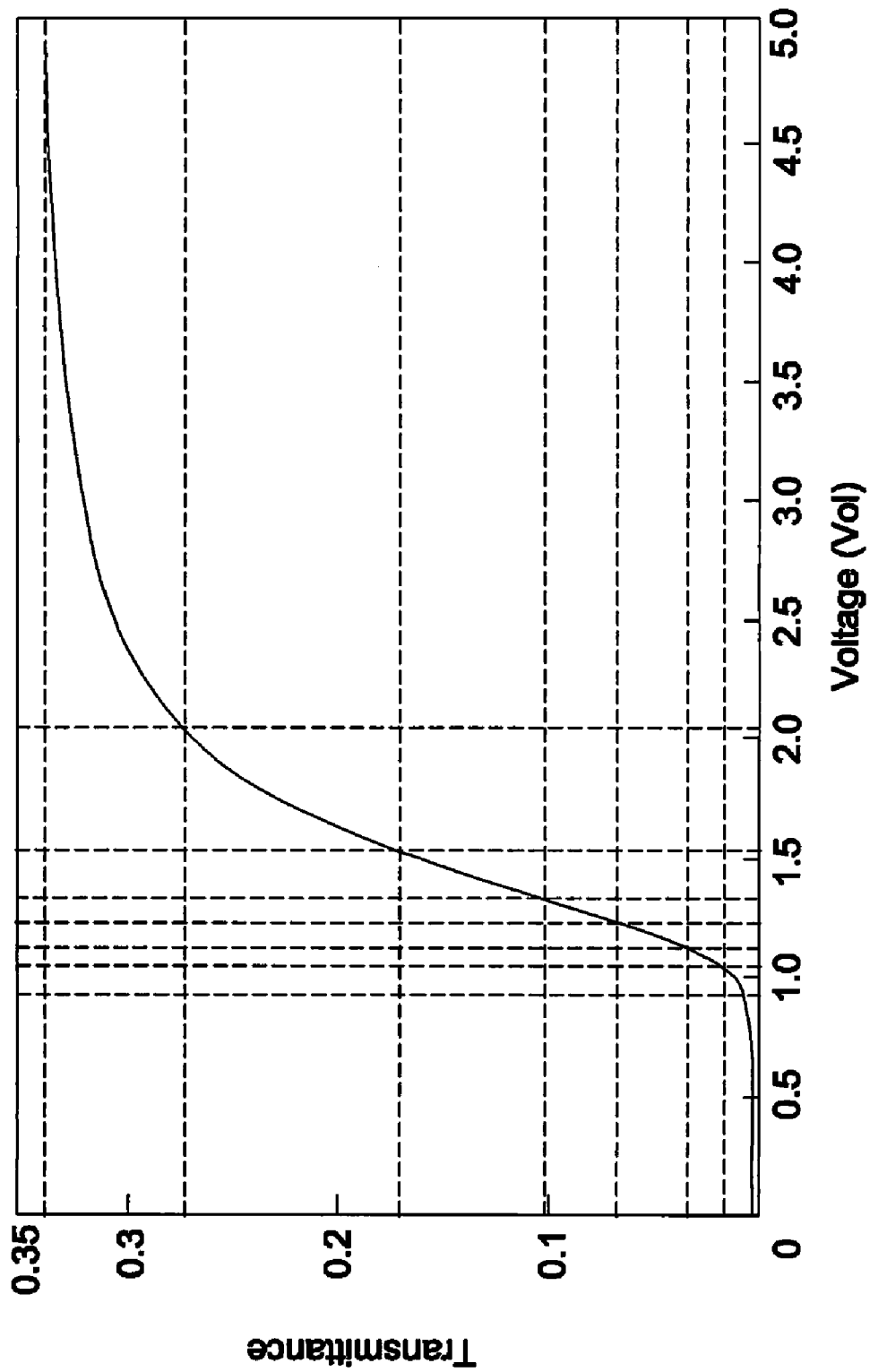

FIG. 8 shows a curve diagram illustrating the V-R characteristics (voltage versus light reflectance) of the optical arrangement shown in FIG. 7, and FIG. 9 shows a curve diagram illustrating the V-T characteristics (voltage versus light transmittance) of the optical arrangements shown in FIG. 7. The results are simulated under the conditions where the transmission-axis azimuth p1 equals 45 degrees, the transmission-axis azimuth p2 equals 135 degrees, the slow-axis azimuth r equals 90 degrees, the oriented viewing angle α equals 0 degree, the twist angle φ equals 0 degree, and the phase retardation Δnd equals 280 nm. FIGS. 10 and 11 show another curve diagrams illustrating the V-R and V-T characteristics of the optical arrangement shown in FIG. 7. The results are simulated under the conditions where the transmission-axis azimuth p1 equals 75 degrees, the transmission-axis azimuth p2 equals −135 degrees, the slow-axis azimuth r equals 60 degrees, the oriented viewing angle α equals 0 degree, the twist angle φ equals 0 degree, and the phase retardation Δnd equals 280 nm.

As shown in FIG. 8 to FIG. 11, the optical arrangement shown in FIG. 7 also forms a normally black mode and achieves competent display contrast. However, when the display contrast for the transmissive region Tr is optimized (FIG. 9), the display contrast for the reflective region Re is not (FIG. 8); in comparison, when the display contrast for the reflective region Re is optimized (FIG. 10), the display contrast for the transmissive region Tr is not (FIG. 11). Hence, the optical matching for the arrangement shown in FIG. 7 in both the reflective region Re and the transmissive region Tr are slightly inferior to that shown in FIG. 3. Though the optical characteristics of the arrangement shown in FIG. 7 is slightly inferior to those shown in FIG. 3, its overall thickness and fabrication cost can be further reduced because only one half wave plate is needed.

FIG. 12 lists test values of optical characteristics of a normally black LCD according to embodiments of the invention in comparison with a normally white LCD. Referring to FIG. 12, the normally black LCD (including embodiments shown in FIG. 3 and FIG. 7) may compare with the normally white LCD in performance, such as display contrast, brightness, luminous reflectance, etc., but the number of required phase difference plates is decreased to reduce the overall thickness and fabrication cost. Further, though the optical characteristics of the embodiment shown in FIG. 7 is slightly inferior to those shown in FIG. 3, as can be clearly seen from FIG. 12, the embodiment shown in FIG. 7 has a comparatively reduced thickness and fabrication cost because only one half wave plate is needed.

Figure 13:
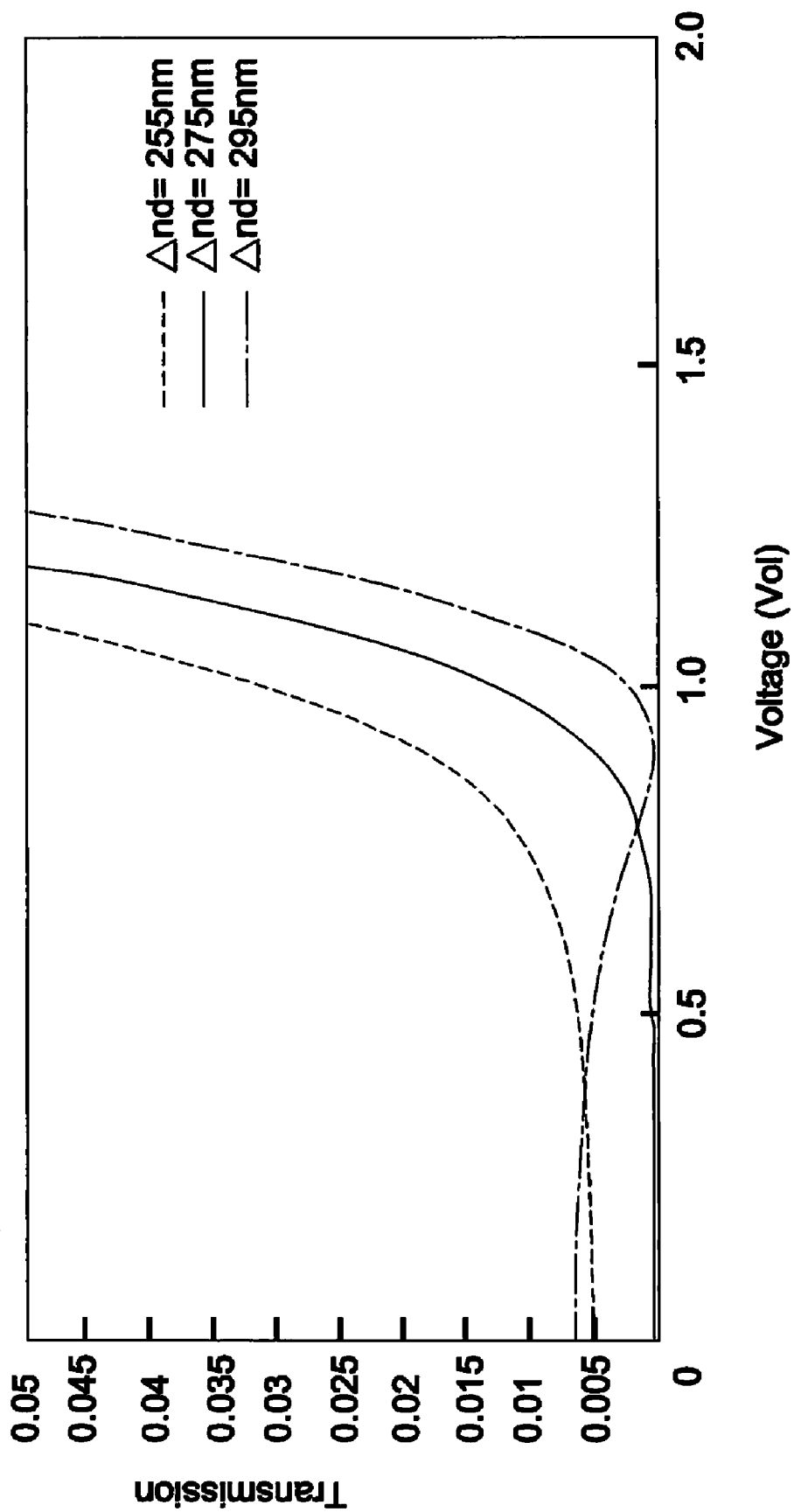
FIG. 13 shows a curve diagram illustrating the optimization of the phase retardation Δnd for an LC cell and a half wave plate.

FIG. 13 shows a curve diagram illustrating the optimization of the phase retardation Δnd for an LC cell and a half wave plate. Particularly, FIG. 13 shows three V-T curves respectively representing the LC-cell phase retardations $\Delta nd_{CELL}$ of 255 nm, 275 nm, and 295 nm, under the condition where a half wave plate having a phase retardation $\Delta nd_{WP}$ of 275 nm is used. Referring to FIG. 13, in case the LC-cell phase retardations $\Delta nd_{CELL}$ (such as 255 nm) is lower than the wave-plate phase retardation $\Delta nd_{WP}$ (such as 275 nm), a fully-black section where the light transmittance is extremely low could not be found in the V-T curve, and thus the display contrast is inferior. Hence, in one embodiment, the LC-cell phase retardation $\Delta nd_{CELL}$ for the transmissive region is set as larger than the half wave-plate phase retardation $\Delta nd_{WP}$, and a prefer range of their difference value is 0-30 nm (30 nm>$\Delta nd_{CELL}$−$\Delta nd_{WP}$>0 nm) to obtain liable optical characteristics. For example, the LC-cell phase retardation $\Delta nd_{CELL}$ may be larger than the half wave-plate phase retardation $\Delta nd_{WP}$ by about 20 nm, with the process tolerance being taken into consideration. Besides, a prefer range of phase retardation $\Delta nd_{WP}$ of the half wave plate is set as larger than 200 nm and smaller than 360 nm. Further, a similar result is obtained when the above optimization is performed in a circumstance where a first half wave plate and a second half wave plate are respectively provided on two opposite sides of a LC cell.

Further, though the above embodiments are exemplified by a dual-cell-gap LC cell, this is not limited. Other type such as a transmissive LCD may also be used in the above embodiments to form a normally black mode.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display, comprising:
   a first and a second transparent substrates facing to each other;
   a liquid crystal layer interposed between the first and the second transparent substrates;
   a first polarizer positioned next to the first transparent substrate and opposite the liquid crystal layer;
   a second polarizer positioned next to the second transparent substrate and opposite the liquid crystal layer; and
   a first half wave plate provided between the first transparent substrate and the first polarizer to enable the liquid crystal display to have a normally black mode, wherein the normally black mode is obtained when the following equation is satisfied:

$$2\alpha - 2r + p1 - p2 = 90° + N*180°,$$

where N is an integer, p1 is the transmission-axis azimuth of the first polarizer, r is the slow-axis azimuth of the first half wave plate, $\alpha$ is the oriented viewing angle of the liquid crystal display, and p2 is the transmission-axis azimuth of the second polarizer.

2. The liquid crystal display as claimed in claim 1, wherein a tolerance of ±5 degrees for each angle solution of the equation is permitted to form the normally black mode.

3. The liquid crystal display as claimed in claim 1, wherein the phase retardation of the first half wave plate is larger than 200 nm and smaller than 360 nm.

4. The liquid crystal display as claimed in claim 1, wherein the liquid crystal layer interposed between the first and the second transparent substrates forms a dual-cell-gap liquid crystal (LC) cell having a reflective region and a transmissive region, and the cell-gap thickness of the reflective region being different to the cell-gap thickness of the transmissive region.

5. The liquid crystal display as claimed in claim 4, wherein a tolerance of ±5 degrees for each angle solution of the equation is permitted to form the normally black mode.

6. The liquid crystal display as claimed in claim 4, wherein the phase retardation of the first half wave plate is larger than 200 nm and smaller than 360 nm.

7. The liquid crystal display as claimed in claim 4, wherein the phase retardation for the transmissive region of the dual-cell-gap LC cell is larger than the phase retardation of the first half wave plate, and the difference value between them is smaller than 30 nm.

8. A liquid crystal display, comprising:
   a first and a second transparent substrates facing to each other;
   a liquid crystal layer interposed between the first and the second transparent substrates;
   a first polarizer positioned next to the first transparent substrate and opposite the liquid crystal layer;
   a second polarizer positioned next to the second transparent substrate and opposite the liquid crystal layer; and
   a first half wave plate provided between the first transparent substrate and the first polarizer to enable the liquid crystal display to have a normally black mode, wherein the phase retardation of the liquid crystal layer is larger than the phase retardation of the first half wave plate, and the difference value between the phase retardation of the liquid crystal layer and the phase retardation of the first half wave plate is smaller than 30 nm.

9. A liquid crystal display, comprising:
   a first and a second transparent substrates facing to each other;
   a liquid crystal layer interposed between the first and the second transparent substrates;
   a first polarizer positioned next to the first transparent substrate and opposite the liquid crystal layer;
   a second polarizer positioned next to the second transparent substrate and opposite the liquid crystal layer;
   a first half wave plate provided between the first transparent substrate and the first polarizer to enable the liquid crystal display to have a normally black mode; and
   a second half wave plate provided between the second transparent substrate and the second polarizer, wherein the normally black mode is obtained when the following equation is satisfied:

$$2r2 - 2\alpha + 2r1 - p1 - p2 = 90° + N*180°,$$

where N is an integer, p1 is the transmission-axis azimuth of the first polarizer, r1 is the slow-axis azimuth of the first half wave plate, $\alpha$ is the oriented viewing angle of the liquid crystal display, p2 is the transmission-axis azimuth of the second polarizer, and r2 is the slow-axis azimuth of the second half wave plate.

10. The liquid crystal display as claimed in claim 9, wherein a tolerance of ±5 degrees for each angle solution of the equation is permitted to form the normally black mode.

11. The liquid crystal display as claimed in claim 9, wherein the phase retardation of the first half wave plate or the second half wave plate is larger than 200 nm and smaller than 360 nm.

12. The liquid crystal display as claimed in claim 9, wherein the phase retardation of the liquid crystal layer is larger than the phase retardation of the first half wave plate or the second half wave plate, the difference value between the phase retardation of the liquid crystal layer and the phase retardation of the first half wave plate is smaller than 30 nm, and the difference value between the phase retardation of the liquid crystal layer and the phase retardation of the second half wave plate is smaller than 30 nm.

13. The liquid crystal display as claimed in claim 9, wherein the liquid crystal layer interposed between the first and the second transparent substrates forms a dual-cell-gap liquid crystal (LC) cell having a reflective region and a transmissive region, and the cell-gap thickness of the reflective region being different to the cell-gap thickness of the transmissive region.

14. The liquid crystal display as claimed in claim 13, wherein a tolerance of ±5 degrees for each angle solution of the equation is permitted to form the normally black mode.

15. The liquid crystal display as claimed in claim 13, wherein the phase retardation of the first half wave plate or the second half wave plate is larger than 200 nm and smaller than 360 nm.

16. The liquid crystal display as claimed in claim 13, wherein the phase retardation for the transmissive region of the dual-cell-gap LC cell is larger than the phase retardation of the first half wave plate or the second half wave plate, the difference value between the phase retardation for the transmissive region of the liquid crystal layer and the phase retardation of the first half wave plate is smaller than 30 nm, and the difference value between the phase retardation for the transmissive region of the liquid crystal layer and the phase retardation of the second half wave plate is smaller than 30 nm.

* * * * *